United States Patent [19]

Kimball

[11] Patent Number: 5,502,357
[45] Date of Patent: Mar. 26, 1996

[54] LOW COST INVERTER FOR EL LAMP

[75] Inventor: Robert A. Kimball, Scottsdale, Ariz.

[73] Assignee: Durel Corporation, Chandler, Ariz.

[21] Appl. No.: 317,198

[22] Filed: Oct. 3, 1994

[51] Int. Cl.[6] .................................................. H05B 37/02
[52] U.S. Cl. .................. 315/209 R; 315/240; 315/169.3; 315/167
[58] Field of Search .................. 315/169.3, 169.1, 315/160, 174, 176, 226, 209 R, 167, 240, 227 R

[56] References Cited

U.S. PATENT DOCUMENTS

| | | | |
|---|---|---|---|
| 4,527,096 | 7/1985 | Kindlmann | 315/169.3 |
| 4,529,322 | 7/1985 | Ueda | 368/225 |
| 5,095,248 | 3/1992 | Sato | 315/169.3 |
| 5,172,032 | 12/1992 | Alessio | 315/169.3 |
| 5,347,198 | 9/1994 | Kimball | 315/209 R X |
| 5,349,269 | 9/1994 | Kimball | 315/169.3 |

FOREIGN PATENT DOCUMENTS 0535885 4/1993 European Pat. Off. .
9323842 11/1993 WIPO .

*Primary Examiner*—Robert J. Pascal
*Assistant Examiner*—Haissa Philogene
*Attorney, Agent, or Firm*—Cahill, Sutton & Thomas

[57] ABSTRACT

An EL lamp is driven by a flyback inverter having an inductor connected in series with a first transistor which switches on and off at a high frequency. The junction of the inductor and transistor is connected through a switching diode to an output terminal for connection to an EL lamp. A discharge path, including a second transistor, is coupled to the lamp for removing accumulated charge. The second transistor switches on and off at a low frequency for periodically discharging the electrical charge accumulated on the EL lamp. In accordance with one aspect of the invention, several diodes are connected in series with the switching diode to block waste current during discharge of the EL lamp. In accordance with another aspect of the invention, the switching diode is temporarily by-passed to provide the discharge path for the lamp. In accordance with either aspect of the invention, the inverter can produce alternating current through the lamp by adding a capacitor in series with the lamp.

10 Claims, 2 Drawing Sheets

LOW COST INVERTER FOR EL LAMP

BACKGROUND OF THE INVENTION

This invention relates to an electroluminescent (EL) lamp and, in particular, to a low cost inverter having a minimal number of components for converting direct current into alternating current for operating an EL lamp.

An EL lamp is essentially a capacitor having a dielectric layer including a phosphor powder which glows in the presence of a strong electric field and a very low current. The dielectric layer is held between two electrodes, one of which is transparent. Because the EL lamp is a capacitor, an alternating current (AC) must be applied to cause the phosphor to glow, otherwise the capacitor charges to the applied voltage and the current through the EL lamp ceases.

For personal electronic devices such as wristwatches, pocket pagers, and cellular telephones, an EL lamp is driven by an inverter which converts direct current from a small battery into alternating current. In order for an EL lamp to glow sufficiently, a peak to peak voltage in excess of about one hundred and twenty volts is necessary. The actual voltage depends on the construction of the lamp and, in particular, the field strength within the phosphor powder.

While there are many ways to increase voltage, e.g. by using a transformer or a voltage doubler, most applications for an EL lamp use what is known as a "flyback" or boost inverter in which the energy stored in an inductor is supplied to the EL lamp as a small pulse of current at high voltage. The inverter typically operates at high frequency (4 khz. or more) to minimize the size of the magnetics, i.e. the inductor or transformer, in the inverter.

The frequency of the alternating current through an EL lamp affects the life of the EL lamp, with frequencies below 1000 hz. being preferred. Too low of a frequency causes a noticeable flicker and low brightness. Thus, a frequency of 100–1000 hz. is preferred although a broader range is useful. Many types of inverters are commercially available for producing AC at a low frequency, i.e. a frequency of approximately 100 to 1000 hz. Frequencies above 1000 hz. can be used if the high frequency signal is modulated with a signal having a frequency of 1000 hz. or less.

It is desired to reduce the size of components as much as possible to reduce the size of personal electronic devices and to provide flexibility in the arrangement of components even if space is not critical. Reducing the number of components further reduces the size and cost of such devices and improves reliability. The number of components often can be reduced by using custom components, which cost more than standard components and may not be as conveniently obtainable as standard components.

Custom components may also enable one to improve the efficiency of an inverter, i.e. the amount of light produced by an EL lamp per unit of electrical power consumed by an inverter and lamp combination. Personal electronic devices, particularly wristwatches, use small batteries. An efficient inverter permits a brighter display, a longer battery life, or both. A brighter display also provides more flexibility in designing the display. For example, one can use black overprints on a bright lamp but not on a dim lamp. A black overprint is a graphic which covers a substantial portion of a lamp to provide a "white on black" display. A more efficient inverter can also produce a higher voltage for the EL lamp, enabling one to use EL lamps having split electrodes, i.e. the electrical equivalent of two (or more) EL lamps connected in series across a source of voltage.

To date, so far as is known, there are no commercially available wristwatches with an EL lamp powered by a single battery having a voltage of 1.5 volts or less, although there are patents describing such watches. One reason for the lack of single battery EL wristwatches is that the step-up ratio necessary for driving an EL lamp from such a low voltage is in excess of 90:1. Producing 140 volts from 1.5 volts is difficult without resorting to high current, i.e. a current greater than 50 milliamperes. Watch batteries, even if capable of providing such current, can not do so for long. The result is that a pair of batteries is used to provide at least 3.0 volts for wristwatch and other applications.

Another reason there are no single battery EL wristwatches is that many semiconductor devices behave differently when the supply voltage drops below 1.5 volts. Integrated circuits work much more slowly, if at all. Voltage drops in the inverter circuit become critical, e.g. a forward biased PN (diode) junction has a voltage drop of about 0.6 volts. Three junctions in series can not be forward biased and an inverter incorporating these junctions will not work at 1.5 volts, although the inverter may work well with a 3.0 volt supply.

FIG. 1 is a schematic diagram of a flyback inverter known in the prior art; e.g. see U.S. Pat. No. 4,527,096 (Kindlmann). When transistor 14 turns on, current flows through inductor 15, storing energy in the magnetic field generated by the inductor. When transistor 14 shuts off, the magnetic field collapses at a rate determined by the turn-off characteristics of transistor 14. The voltage across inductor 15 is proportional to the rate at which the field collapses. Thus, a low voltage and large current is converted into a high voltage at a small current.

The current pulses are coupled through diode 16 to the DC diagonal of a switching bridge having EL lamp 12 connected across the AC diagonal. Assuming that transistors 18 and 19 are conducting, the same amount of energy is supplied to lamp 12 each time transistor 14 turns off and, therefore, the voltage on the lamp is pumped up by a series of current pulses from inductor 15 as transistor 14 repeatedly turns on and off. Diode 16 prevents lamp 12 from discharging through transistor 14. If transistor 14 were switched on and off continuously, the pulses would charge lamp 12 to the maximum voltage available from inductor 15, e.g. about 140 volts. Since an EL lamp needs an alternating current or a variable direct current, the lamp would glow initially and then extinguish when the capacitance of the lamp became fully charged.

To avoid this problem, the transistors in opposite sides of the bridge alternately conduct to reverse the connections to lamp 12. The bridge transistors switch at a lower frequency than transistor 14. The four bridge transistors are high voltage components, adding considerably to the size and cost of the circuit. In addition, the circuit is not single ended, i.e. one cannot ground one side of lamp 12.

It is preferred that an inverter have a single ended output, i.e. a high voltage terminal and a ground terminal for connection to a lamp. Many inverters of the prior art require that neither electrode of an EL lamp be grounded. This often complicates making electrical connections to a lamp or making connections to several lamps.

FIG. 2 is the schematic of an inverter disclosed as prior art in U.S. Pat. No. 4,529,322 (Ueda). In this inverter, transistor 14 is switched on and off at about 8 khz. When transistor 21 is conducting, lamp 12 is discharged and the current through the lamp is variable DC, not AC. Since the EL lamp and the discharge transistor are series connected across the power supply, there will always be a residual DC bias across lamp 12 equal to the voltage at terminal 13. DC bias on an EL lamp can cause corrosion and shorting of the electrodes of the lamp, particularly at elevated temperature and humidity, decreasing the life of the lamp. In watch applications, a DC bias can be tolerated because the lamp is not used often and the life of the lamp far exceeds the life of the watch. In other applications, DC bias is a problem.

A second problem with the circuit disclosed in the Ueda patent is that transistor 21 draws current from terminal 13 through diode 16. This current is wasted since it does not contribute to powering lamp 12 and it reduces the efficiency of the inverter. The waste current is limited by resistor 22, connected between the emitter of transistor 21 and ground, but the circuit is inefficient nevertheless because the discharge of lamp 12 pushes current in the wrong (forward) direction through the power supply connected to terminal 13 and ground.

FIG. 3 is a portion of a schematic disclosed in PCT application no. PCT/US93/04698 (McLaughlin et al.) which discloses an EL lamp powered by a flyback inverter. A discharge path includes transistor 37 connected in parallel with lamp 36 and the transistor is driven at the same frequency as transistor 32. Since the charging and discharging transistors turn on and off together, one does not have the waste current as in the circuit shown in FIG. 2. However, the circuit of FIG. 3 does not use a series of pulses to pump up the voltage across an EL lamp, a single pulse is used instead. A relationship used in the art to estimate component values is $f_h Li^2 \geq f_l CV^2$. (fh is high frequency, L is inductance, i is current, $f_l$ is low frequency, C is capacitance, and V is voltage.) In order to produce a high voltage across an EL lamp from a single pulse, the inverter described in the PCT application must use a relatively large current, greater than 50 ma., to create a large magnetic field and the inductor must have a fairly large inductance. Since high current, high voltage components are physically large and are expensive, the inverter is not commercially practical.

FIG. 4 is a portion of a schematic of an inverter disclosed in European patent application EP 0 535 885 A2 (Komoda). Transistor 42 is driven at 250 khz. and transistor 47 is driven at 200 hz. A voltage tripler including three diodes connects EL lamp 46 to the junction of transistor 42 and inductor 41. The supply voltage is not disclosed. An output voltage of 300 volts peak to peak is alleged.

Thus, while many circuits exist in the prior art for inverting low voltage DC to high voltage AC, these circuits typically include many components, including custom semiconductor devices and custom magnetics, increasing the cost and power dissipation of the circuits. For wristwatches, pagers, and other applications where a small battery is used as the power source, it is desired to minimize power consumption and to improve the efficiency of an inverter for an EL lamp.

In view of the foregoing, it is therefore an object of the invention to provide a low cost inverter for an EL lamp, the inverter having a minimum number of components and using only commodity components, i.e. easily obtainable and inexpensive components.

Another object of the invention is to provide a small, efficient inverter for EL lamps.

A further object of the invention is to provide a low cost inverter suitable for watch, pager, and other applications wherein the power supply is a small battery having a voltage of three volts or less.

Another object of the invention is to provide a small, efficient, single ended inverter for EL lamps.

A further object of the invention is to eliminate waste current in an inverter.

Another object of the invention is to provide an inverter having few components in which efficiency is improved by coupling unused energy back to the power supply.

SUMMARY OF THE INVENTION

The foregoing objects are achieved in this invention in which an EL lamp is driven by a flyback inverter having an inductor connected in series across a power source with a first transistor which switches on and off at a high frequency. The junction of the inductor and transistor is connected through a switching diode to an output terminal for connection to an EL lamp. A discharge path, including a second transistor, is coupled to the lamp for removing accumulated charge. The second transistor switches on and off at a low frequency for periodically discharging the electrical charge accumulated on the EL lamp. In accordance with one aspect of the invention, several diodes are connected in series with the switching diode to block waste current during discharge of the EL lamp. In accordance with another aspect of the invention, the switching diode is temporarily by-passed to provide the discharge path for the lamp. In accordance with either aspect of the invention, the inverter can produce true AC by adding a capacitor in series with the EL lamp.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
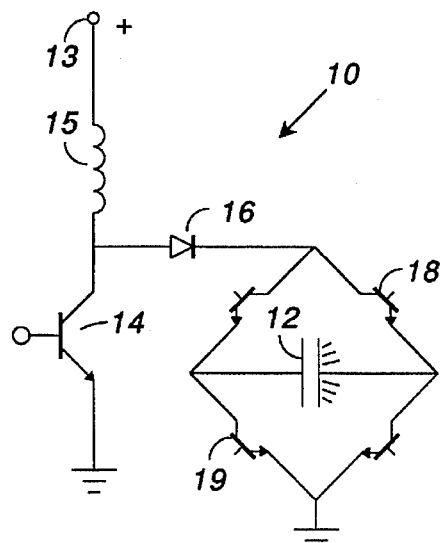
FIG. 1 is a schematic of a flyback inverter of the prior art.
Figure 2:
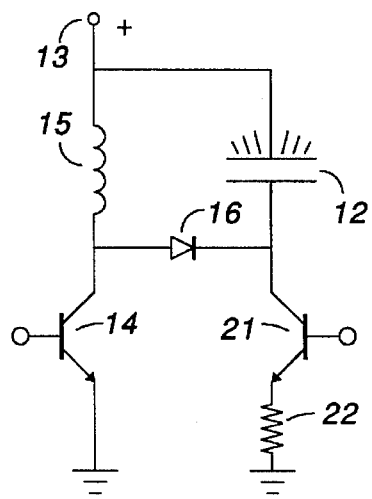
FIG. 2 is a schematic of a flyback inverter of the prior art.
Figure 3:
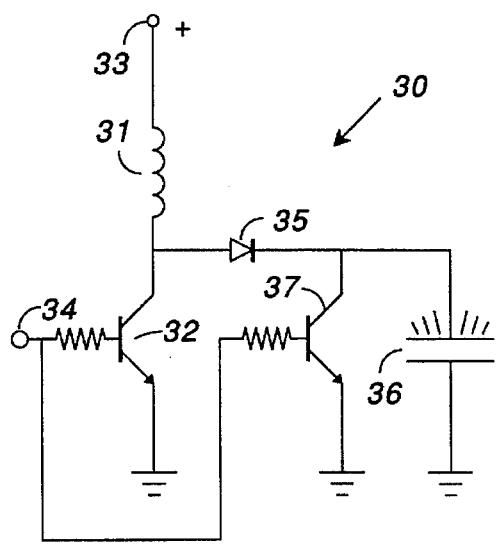
FIG. 3 is a schematic of a flyback inverter of the prior art.
Figure 4:
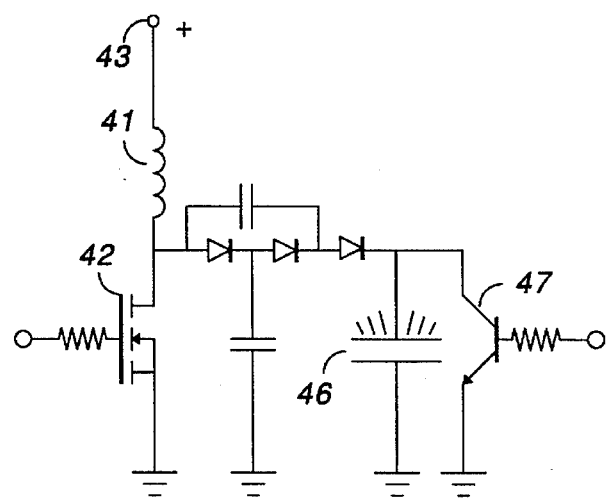
FIG. 4 is a schematic of a flyback inverter of the prior art.
Figure 5:
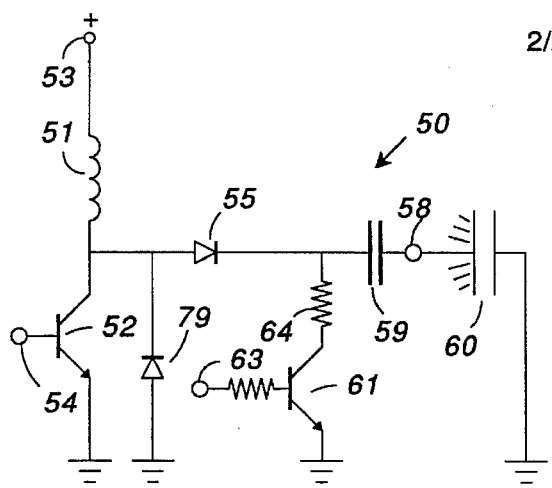
FIG. 5 is a schematic of an inverter constructed in accordance with the invention.

FIG. 5 is a schematic of an inverter constructed in accordance with the invention. Inverter 50 includes inductor 51 and transistor 52 series connected between supply terminal 53 and ground. The junction between inductor 51 and transistor 52 is connected through switching diode 55 to output terminal 58. One electrode of EL lamp 60 is connected to output terminal 58 and the other electrode of the lamp is grounded. Capacitor 59 is optionally provided, connected between switching diode 55 and EL lamp 60.

The output from inverter 50 as described thus far is variable direct current. In order to produce alternating current through lamp 60, capacitor 59 is connected in series between switching diode 55 and the lamp. Adding capacitor 59 slightly reduces the brightness of lamp 60 because the available voltage is divided between capacitor 59 and EL lamp 60.

The voltage on each series connected capacitor is inversely proportional to capacitance. Capacitor 59 preferably has a capacitance ten times the capacitance of lamp 60, in which case the voltage across lamp 60 is reduced about ten percent and the brightness of lamp 60 is reduced at least the same amount.

A discharge path for lamp 60 includes transistor 61 and series connected resistor 64, connected in parallel with lamp 60 between output terminal 58 and ground. Transistor 52 is turned on and off at high frequency, e.g. 30 kilohertz, by a signal applied to input terminal 54 for charging lamp 60. Transistor 61 is turned on and off periodically at a low frequency, e.g. 100 hz., by a signal applied to input terminal 63 for discharging the lamp. Suitable sources for high frequency and low frequency signals are well known per se in the art.

Figure 6:
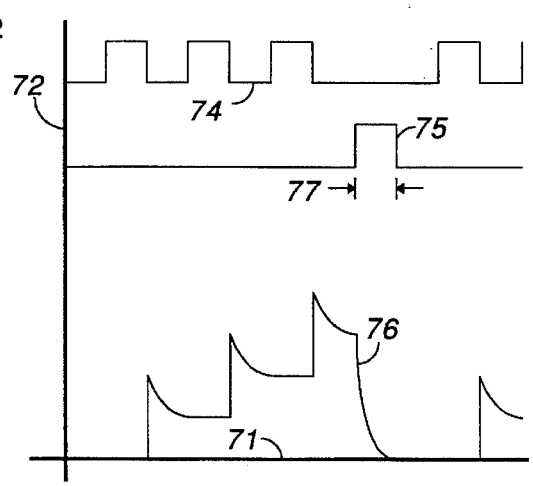
FIG. 6 illustrates the drive signals applied to the inverter of FIG. 5 and the voltage on an EL lamp.
Figure 7:
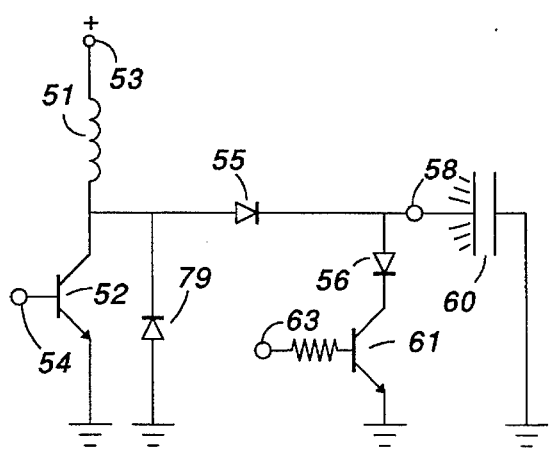
FIG. 7 is a schematic of an inverter constructed in accordance with an alternative embodiment of the invention.

The operation of inverter 50 is illustrated by the waveforms in FIG. 6. In FIG. 6, abscissa 71 represents time and ordinate 72 represents voltage. Waveform 74 represents the high frequency pulses applied to input terminal 54. Although illustrated as having a fifty percent duty cycle, the pulses applied to input terminal 54 can have a larger or smaller duty cycle. Each pulse of waveform 74 corresponds to a pulse of charge from inductor 51 to capacitor 60. The pulses of charge progressively increase the voltage on lamp 60, represented by waveform 76.

Pulse 75 represents a pulse applied to input terminal 63 for periodically discharging lamp 60 through transistor 61. The combination of pulses on transistors 52 and 61 produces an approximately sawtooth waveform having an average value somewhere between zero volts and the maximum voltage available from inductor 51, i.e. the average is not zero and the waveform is more accurately described as variable direct current rather than as alternating current. The output voltage from inverter 50 operates lamp 60 at full brightness nevertheless.

As illustrated in FIG. 6, the pulses applied to input terminals 54 and 63 have the same duration but different frequencies and duty cycles. The duty cycle of pulse 75 is relatively small but the duration of the pulse is longer than the time constant of lamp 60 and resistor 64, permitting lamp 60 to discharge to approximately zero volts. Pulses 74 and 75 can be derived from a common source (not shown), which facilitates suppressing pulses to input terminal 54 when a pulse is applied to input 63, i.e. transistor 52 is off when transistor 61 is on. This prevents the circuit from pumping charge directly into the discharge path.

In FIG. 5, the discharge path including transistor 61 and resistor 64 also provides a path for current through inductor 51 and switching diode 55. The current from this path is waste current, which is reduced by resistor 64. The waste current is eliminated by one or more blocking diodes, represented in FIG. 6 by diode 56, connected in series with transistor 61. The number of blocking diodes depends upon the supply voltage and is approximately equal to the integer quotient of said low voltage divided by 0.6. At a supply voltage of 1.5 volts, waste current is eliminated by adding two blocking diodes, which isolate the discharge path from the inductor and supply voltage. The blocking diodes replace resistor 64 (FIG. 5) and raise the voltage on the cathode of diode 55 to keep diode 55 reverse biased when transistor 61 is conducting.

Because waste current is eliminated, one can reduce the current drawn by an inverter constructed in accordance with the invention or one can draw the same current but produce a higher output voltage and therefore drive a EL lamp to a higher brightness. An inverter constructed in accordance with the invention also gives one the option of sacrificing a small amount of brightness for alternating current, thereby eliminating DC bias. These choices are not available with inverters of the prior art which are inoperative or marginal at 1.5 volts.

Diode 79 further reduces losses by preventing transistor 52 from operating in the inverse active mode, i.e. preventing transistor 52 from conducting current from the power supply through the forward biased base-collector junction. This is a very inefficient mode of operation because a bipolar transistor does not conduct very well and has a voltage drop of about 2.0–2.5 volts. Diode 79, on the other hand, has a low forward resistance and a voltage drop of only 0.6 volts.

It has been found that inverse active mode occurs because switching diode 55 is not an ideal switch under high voltage conditions and does not shut off immediately when reverse biased. Absent diode 55, inductor 51 and lamp 60 form a resonant circuit which will oscillate or ring in response to a pulse. When transistor 52 shuts off, a positive pulse from inductor 51 charges lamp 60. A part of the negative going portion of the ring is conducted through diode 55, causing the junction of inductor 51 and transistor 52 to go negative, forward biasing the base-collector junction of the transistor. Adding diode 79 as a shunt around transistor 52 would seem to make the problem worse by providing a lower resistance path but, in fact, the addition of diode 79 improves the efficiency of the circuit.

Figure 8:
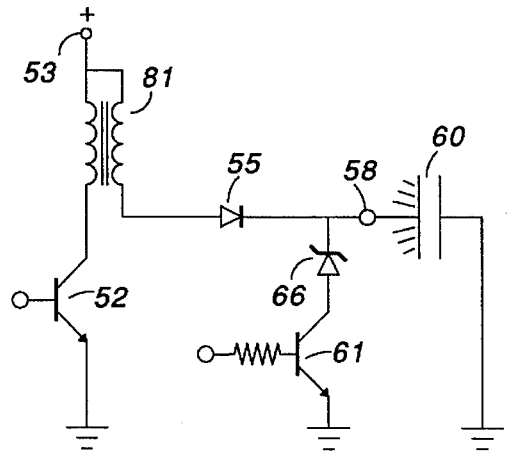
FIG. 8 is a schematic of an inverter constructed in accordance with an alternative embodiment of the invention.

FIG. 8 illustrates an alternative embodiment in which a zener diode is substituted for the blocking diodes. In addition, a transformer has been substituted for the single inductor of previous embodiments. The secondary winding of transformer 81 is connected between switching diode 55 and terminal 53. Transformer 81 operates in a manner similar to inductor 51 in providing a series of pulses through switching diode 55 to charge lamp 60. A transformer is more efficient and can produce higher voltages than a single inductor but a transformer is physically larger than a single inductor and may not be suitable for applications where space is at a premium, e.g. pagers and watches. The secondary of transformer 81 can be referenced to the supply voltage, as shown, or to ground. If the secondary is referenced to ground, there is no waste current because the discharge path is isolated by transformer 81.

The zener voltage is chosen to be equal to or slightly less than the supply voltage. In this embodiment, when transistor 61 conducts, zener diode 66 keeps the cathode of diode 55 at least the zener voltage above ground to prevent waste current through the secondary of transformer 81. For example, if a five volt zener diode were used then output terminal 58 would be held at 5.2 volts (the zener voltage plus the forward voltage drop across transistor 61). The supply voltage would have to be greater than 5.8 volts for switching diode 55 to conduct. By using a zener voltage approximately equal to the supply voltage, waste current is eliminated when lamp 60 is discharged.

Figure 9:
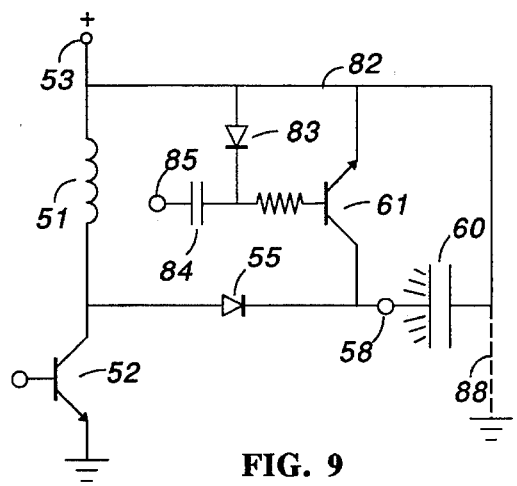
FIG. 9 is a schematic of an inverter constructed in accordance with a preferred embodiment of the invention.

FIG. 9 illustrates a preferred embodiment of the invention in which lamp 60 is referenced to the supply voltage. Transistor 52 is connected in parallel with lamp 60 between supply terminal 53 and output terminal 58. Low frequency pulses are coupled to terminal 85 for switching transistor 61 on and off. There is no waste current since transistor 61 does not provide a path to ground.

Diode 83 and capacitor 84 cooperate to raise the voltage on the base of transistor 61 above the supply voltage on rail 82, thereby turning on transistor 61. When input terminal 85 is at ground potential, diode 83 is forward biased, charging capacitor 84. When input terminal 85 switches high, the input voltage adds to the voltage on capacitor 84 to forward bias the base-emitter junction of transistor 61. Transistor 61 conducts for a sufficient time to discharge lamp 60.

As indicated by dashed line 88, lamp 60 can be connected between output terminal 58 and ground. If this is done, the discharge of lamp 60 transfers the energy stored in the lamp to the power supply connected between terminal 53 and ground. This regenerative effect further improves the efficiency of the inverter.

Figure 10:
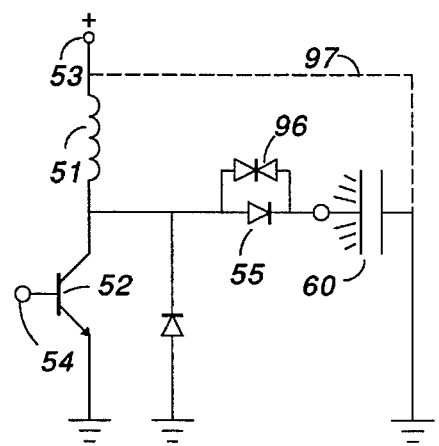
FIG. 10 is a schematic of an inverter constructed in accordance with another aspect of the invention.

FIG. 10 illustrates an alternative embodiment of the invention in which switching diode 55 is bypassed by DIAC 96. When the voltage across DIAC 96 exceeds the turn-on voltage of the DIAC, the DIAC conducts, bypassing switching diode 55, and discharges the capacitance of lamp 60. The switching of DIAC 96 is not synchronized with the switching of transistor 52 and the DIAC may fire either when the transistor is conducting or when the transistor is not conducting. If DIAC 96 fires when transistor 52 is not conducting, then the current from lamp 60 flows through inductor 51 and out of terminal 53, slightly recharging the battery (not shown). This regenerative operation conserves energy and improves the efficiency of the inverter.

If DIAC 96 fires when transistor 52 is conducting, then the current from lamp 60 flows through the transistor. Since the voltage on lamp 60 is incrementally increased each time that transistor 52 shuts off, it is unlikely that DIAC 96 will trigger when transistor 52 is conducting. However, actual voltages within the inverter are not as simple as illustrated in FIG. 6 and effects such as ringing, overshoot, and noise occasionally can cause DIAC 96 to fire when transistor 52 is conducting.

The invention thus provides a low cost, single ended inverter for an EL lamp in which the inverter has a minimum number of components and uses only commodity components. By eliminating waste current, the inverter is as efficient as much more complex circuits and can drive an EL lamp from a one volt battery. At higher voltages, the efficiency and brightness provide customers with great flexibility in designing EL lamps and inverters into their products since the available brightness is so high. One can simplify existing products yet provide a brighter display or trade brightness for current and greatly reduce current consumption.

Having thus described the invention, it will be apparent to those of skill in the art that various modifications can be made within the scope of the invention. For example, the type of transistor used is not critical, i.e. PNP transistors can be used instead of NPN transistors. A switching transistor can be substituted for the switching diode. While intended to be constructed from commodity components, an inverter can be constructed in accordance with the invention from more expensive components. An inverter constructed in accordance with the invention used a Rohm type IMX8 device in which a pair of discrete transistors are contained in a single package, diodes 55 and 56 were type 1N914 switching diodes, and inductor 51 was a standard watch inductor having an inductance of 1 mH. The inverter operated on as little as one volt (1.0 not 1.5 volts) at four milliamperes, producing 86 volts and a brightness of 0.6 ft. Lambert in an EL lamp one inch square. (This is equal to the brightness of an EL lamp in commercially available watches, which use a three volt supply.) At three volts and nine milliamperes, the same inverter produced 218 volts and a brightness of 6.7 ft. Lambert from the same lamp.

What is claimed is:

1. A low cost inverter for powering an electroluminescent lamp from a low voltage DC source, said inverter comprising:

a supply terminal and a ground terminal for connection to said DC source;

an output terminal for connection to a first electrode of said electroluminescent lamp;

means connected to said supply terminal, said ground terminal and said output terminal for providing pulses to said lamp; and a discharge path for discharging said lamp, said discharge path including a first transistor connected between said output terminal and said supply terminal for eliminating waste current in said discharge path.

2. The inverter as set forth in claim 1 wherein said means for providing pulses includes:

an inductor;

a second transistor connected in series with said inductor between said supply terminal and said ground terminal and having a junction between said first transistor and said inductor;

a switching diode coupled between said junction and said output terminal.

3. The inverter as set forth in claim 2 and further including a shunt diode connected in parallel with said second transistor for preventing said second transistor from operating in inverse active mode.

4. The inverter as set forth in claim 2 and including a transformer having a primary winding and a secondary winding, wherein the primary winding is said inductor and said secondary winding is connected between said switching diode and said supply terminal.

5. The inverter as set forth in claim 1 and further including a capacitor coupled between said means and said output terminal for producing alternating current through said lamp.

6. The inverter as set forth in claim 5 wherein said capacitor has a capacitance at least ten times the capacitance of said lamp.

7. The inverter as set forth in claim 1 wherein said discharge path includes:

a control input terminal;

a capacitor coupling said transistor to said control input terminal; and a diode coupled between said capacitor and said supply terminal.

8. A low cost inverter for powering an electroluminescent lamp from a low voltage DC source, said inverter comprising:

a supply terminal and a ground terminal for connection to said DC source;

an output terminal for connection to a first electrode of said electroluminescent lamp;

an inductor;

a first transistor connected in series with said inductor between said supply terminal and said ground terminal and having a junction between said first transistor and said inductor;

a switching diode coupled between said junction and said output terminal;

a discharge path coupled to said output terminal for discharging said lamp, said discharge path including a second transistor; and at least one diode in series with said second transistor for decoupling said second transistor from said output terminal.

9. The inverter as set forth in claim 8 wherein said diode is a zener diode having a zener voltage approximately equal to said low voltage.

10. The inverter as set forth in claim 8 wherein the number of diodes in series with said second transistor is approximately equal to the integer quotient of said low voltage divided by 0.6.

* * * * *